United States Patent
Rau et al.

[11] Patent Number: 6,106,788
[45] Date of Patent: *Aug. 22, 2000

[54] PROCESS AND DEVICE FOR GENERATING OZONE

[75] Inventors: Stephan Rau, Bad Salzuflen; Abdol Hossein Shadiakhy, Puhlheim; Lutz Blaich, Köln, all of Germany

[73] Assignee: Wedeco Umwelttechnologie Wasser-Boden-Luft GmbH, Herford, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/836,253

[22] PCT Filed: Aug. 30, 1996

[86] PCT No.: PCT/DE96/01612

§ 371 Date: May 2, 1997

§ 102(e) Date: May 2, 1997

[87] PCT Pub. No.: WO97/09268

PCT Pub. Date: Mar. 13, 1997

[30] Foreign Application Priority Data

Sep. 2, 1995 [DE] Germany .............. 195 32 526

[51] Int. Cl.[7] .................................................. B01J 19/08
[52] U.S. Cl. ............... 422/186.07; 422/186.11; 422/186.19; 422/186.2
[58] Field of Search .................... 422/186.11, 186.19, 422/186.2, 907, 186.07

[56] References Cited

U.S. PATENT DOCUMENTS 4,232,229 11/1980 Tanaka et al. .................. 250/541
5,458,856 10/1995 Marie et al. ................. 422/186.11

FOREIGN PATENT DOCUMENTS 0 515 111 A1 11/1992 European Pat. Off. .
3819304 12/1989 Germany .
WO 93/16001 8/1993 WIPO .

OTHER PUBLICATIONS

"Modular Ozonizers", Inventor: Fritz Hailer, Applicant: Ingenieria y Technica del Secado, S.A., ES 2,027,892 (Jun. 16, 1992), Application No. 9,100,163 (Jan. 22, 1991), Chemical Abstract, vol. 117, No. 24, Dec. 14, 1992, Abstract No. 236654b.

"Active Nuclide Generating Device", Applicant: Sachiko Okazaki, Japanese Publication No. 1–51303, Feb. 27, 1989, Application No. 62–206533, Aug. 21, 1987, Patent Abstracts of Japan, vol. 13, No. 241, (C–604) [3589], Jun. 6, 1989.

"Ozonizer", Applicant: Hitachi Seisakusho K.K., Inventor: Shiyouhei Uozumi et al., Japanese Publication No. 53–54190, May 17, 1978, Application No. 51–128330, Oct. 27, 1976, Patent Abstracts of Japan, vol. 2, No. 93, (C–78), Jul. 29, 1978.

Primary Examiner—Kishor Mayekar
Attorney, Agent, or Firm—Burns, Doane, Swecker & Mathis, L.L.P.

[57] ABSTRACT

A device for generating ozone from oxygen-containing gases by a silent discharge includes an arrangement with at least one gap through which the gas flows. The arrangement includes an electrode and a dielectric that separates the gap from another electrode. The gap is filled up with an electrically and thermally conductive gas-permeable arrangement that is in electrical and thermal contact with the adjacent electrode and that the oxygen-containing gas flows through. The gas-permeable arrangement includes a multiplicity of discharge spaces wherein the oxygen-containing gas is exposed to a high field strength and converted into ozone, and the reaction heat occurring in the gap is dissipated to the adjacent electrode by the electrically and thermally conductive gas-permeable arrangement.

21 Claims, 2 Drawing Sheets

PROCESS AND DEVICE FOR GENERATING OZONE

This application is a 35 U.S.C. 371 National Stage filing of PCT/DE96/01612 filed Aug. 30, 1996.

BACKGROUND AND SUMMARY

The invention concerns a method of generating ozone in accordance with the preamble to claim 1 and a device for generating ozone in accordance with the preamble to claim 2.

Ozone is a powerful oxidizing agent for organic substances and for inorganic compounds which contain elements with several oxidation degrees. Of the multiple fields of application for ozone, its use for water conditioning is to be mentioned among other things.

Technically, ozone can be generated by silent discharge in an oxygen-containing gas. Silent discharge is, in contrast to spark discharge, to be understood as a stable plasma discharge or coronal discharge. Molecular oxygen is dissociated into atomic oxygen. The reactive oxygen atoms subsequently attach themselves in an exothermic reaction to molecular oxygen and form tri-atomic oxygen molecules, accordingly ozone. The ozone yield is dependent among other things on the electric field strength and operating temperature. Moreover, a dependence on gas composition has been observed. The dependence on operating temperature rests on the fact that ozone at higher temperatures decomposes more rapidly again into molecular oxygen and, due to the accordingly dictated displacement of the equilibrium between the originating and disintegrating ozone, the available ozone concentration is less.

Higher field strengths, which likewise lead to an increased ozone yield, can among other things be achieved through a diminution of the gap and through the selection of dielectrics with higher relative dielectricity constants. For dielectrics with high relative dielectricity constants, doped glasses or ceramic materials enter the question. To be sure, dielectrics of ceramic materials have the drawback that they are inhomogeneous and can practically have a lower puncture strength than homogeneous materials. Furthermore, high-grade ceramic materials in the form of formed bodies with high dimensional stability are extremely expensive. Thinner dielectrics, furthermore, increase the risk of dielectric puncture.

Limits have been established for diminution of the gap due to inescapable manufacturing tolerances along with bending and buckling due to mechanical stresses and heat expansion in operation.

Since a field-strength increase by diminution of the gap width and by using dielectrics with high dielectricity constants leads to a considerable rise in the manufacturing cost, economic limits have here been established.

With DE 38 19 304 C2 as a point of departure, basic to the invention is the task of describing a method and a device with which the ozone yield can be further increased at a comparable employment of energy.

This task is solved in a method according to the present invention and in a device according to the present invention.

The success of the invention rests on several physical influences.

Due to the electrically and thermally conductive arrangement it is achieved that, during forced cooling of the electrodes, the heat that occurs due to the discharge as well as due to the exothermic reaction of the atomic with the molecular oxygen will be better conveyed in the gap between the electrode and the dielectric as well as out of the dielectric since, on the one hand, a direct heat-conducting connection exists between the electrode and the dielectric and, on the other, the area of heat transmission to the throughflowing gas is substantially increased while the heat transmission path to all the points inside the gap is decreased. Since ozone has the tendency to disintegrate again with increasing temperature so that a temperature-dependent equilibrium adjusts itself between the ozone content and the oxygen content, effective cooling can diminish the disintegration of ozone and accordingly improve the yield.

In contrast to a normal gap, which the oxygen-containing gas and the generated ozone flows through in an almost laminar flow, there is forced, due to the electrically and thermally conductive gas permeable arrangement, a turbulent flow in the gap with the consequence that the gas molecules also arrive over and over against the surface of the directly coolable electrodes and therefore give off heat better.

Another improvement in the ozone yield derives from the electrode surface, enlarged by means of the electrically and thermally conductive gas-permeable arrangement, and the effective diminution of the gap. Due to the electrically and thermally conductive gas permeable arrangement it is no longer only the surface of the electrodes itself that is available for the discharge, but also the surface of the arrangement and its ionized environment.

Also achieved due to the arrangement, which fills the real gap, is a smaller, locally different electrically effective gap. The local fields accordingly vary considerably and frequently along the stretch of path of the throughflowing gas, and a good yield of ozone-containing gas is achieved.

Next to the purely surface enlargement and gap diminution, however, there is in addition a physical effect that is designated a hollow-cathode effect and is usually undesired for the generation of large-area homogeneous plasmas.

As to a hollow-cathode effect, it is a matter of an intensive plasma discharge inside a hollow space that is surrounded by the same potential. In the present invention, however, this effect is advantageously utilized in that the hollow spaces are in connection one with another and, thus, the more powerfully generated ozone inside the hollow spaces can also be transported farther. The hollow-cathode effect leads also to a greater increase in ozone formation than could be expected just from the enlarged surface of the electrically and thermally conductive gas permeable arrangement and the diminishment of the partial gap distance.

The electrically and thermally conductive gas-permeable arrangement leads also to better gas mixing. Thereby the probability is also increased that the oxygen molecules become dissociated by the electric field and the result oxygen atoms subsequently enter into the bonding with molecular oxygen into ozone. The ozone yield is also increased by this effect.

Instead of just one gap there can also be provided two gaps that are constituted between a first electrode and a second electrode and separated by a common dielectric. Both gaps are filled by an electrically and thermally conductive gas-permeable arrangement. This is an especially economical solution for increasing the ozone yield in that doubling of the gap is achieved with doubling the electrodes and the dielectric.

A first embodiment of the invention provides that the first and second electrode and the dielectric are plate-shaped. The electrically and thermally conductive gas-permeable arrangement can in this event also advantageously be a spreader in order to compensate for insufficient inherent rigidity on the part of the electrodes or dielectric.

In one alternative embodiment of the invention the first and second electrode and the dielectric are constructed cylindrically symmetrically to each other. In this event the dielectric is disposed in a space enclosed by the first electrode and the second electrode is disposed in a space enclosed by the dielectric. Here as well the electrically and thermally conductive gas-permeable arrangement can be advantageously employed as a spreader and for centering.

In the cylindrically symmetrical embodiment of the device in accordance with the invention, execution of the second electrode with a polygonal surface is of advantage. Assembly of the electrically and thermally conductive gas-permeable arrangement will then be facilitated in that during oversweep of the second electrode the frictional forces will be smaller than with a circular surface. The arrangement can on the other hand yield toward the flat regions between the edges if radial forces become active or deviations occur in the straight-line orientation or diameter of the dielectric or electrode.

The second electrode can be constructed solid or hollow. With the solid construction, a larger cross-section is available along the axial direction for the heat dissipation, whereas the hollow execution allows cooling by means of a coolant.

The first electrode is preferably disposed in a coolant. The range of temperatures necessary for a high ozone yield can, due to forced cooling, be maintained even during high loss output in the gap. This measure is especially effective with a gap lying outside the dielectric.

The heat dissipation from the second electrode can be improved when, in the event of its hollow construction, the hollow region has a coolant flowing through it. This measure is especially effective with a gap lying inside the dielectric. With two gaps, optimal results are obtained when the first electrode is disposed in a coolant and the second electrode has a coolant flowing through it.

Instead of two rigid electrodes, the inside of the cylindrical dielectric can be completely filled with the electrically and thermally conductive gas-permeable arrangement and the arrangement can simultaneously constitute the second electrode. In this way an especially adaptable combination of electrode and electrically and thermally conductive gas-permeable arrangement can be achieved.

In the event of a device with two gaps, they can be aligned parallel to or in series with the flow of gas. With parallel alignment there will be a larger flow cross-section whereas with serial alignment a longer reaction way will be made available.

The electrically and thermally conductive gas-permeable arrangement can comprise chips, granulate, wire, or porous bodies, whereby the wire execution in turn can be a tangle, plait, woven, non-woven, or knit.

With the employment of granulated, it can be a matter of porous granulate, due to which the surface of the inner hollow spaces can be exploited for ozone generation.

Furthermore, it is also possible to employ several porous bodies adapted to the gap or one porous body instead of granulate. These bodies can be inserted separately into the gap, connected to the electrode pointing toward the gap, or even integrated into the surface of the electrode.

It has turned out that a wire knit is especially advantageous because it can be manufactured reproducibly and therefore the properties of the ozone-generator element are also precisely reproducible.

With the cylindrically symmetrical execution of the device the knit can be manufactured in a stocking-like shape and, during assembly, simply drawn over the two electrodes, meaning the inner electrode and/or over the dielectric. The knit will simultaneously assume the centering of the inner electrode with respect to the dielectric and of the dielectric with respect to the first electrode, meaning the outer electrode, so that the use of the otherwise common centering element can be done without.

One practical embodiment of the device in accordance with the invention provides that the electrically and thermally conductive gas-permeable arrangement fills about 1 to 50% and preferably 4 to 20% of the gap volume. When wire is used, it will for practical purposes exhibit a cross-sectional area smaller than 0.2 mm2 and preferably smaller than 0.03 mm2.

By adapting the mesh number, mesh size, and wire thickness as well as the knit density, the number of knit wires and the number of knit layers, it is possible to establish the impedance of the arrangement, to adapt the size of the discharge spaces for maximal ozone production, to regulate the turbulence and intermixture of the gas, and to optimize cooling and heat dissipation. With two parallel gaps they can thus also be adapted for optimal ozone yield.

It is practical that the electrically and thermally conductive gas-permeable arrangement consists of oxygen- and ozone-resistant material. This measure provides for uniform ozone-generating properties and maintenance freedom.

BRIEF DESCRIPTION OF THE DRAWINGS

The invention will now be described by way of exemplary embodiments, which are illustrated in the drawing. In the drawing.

DETAILED DESCRIPTION

Figure 1:
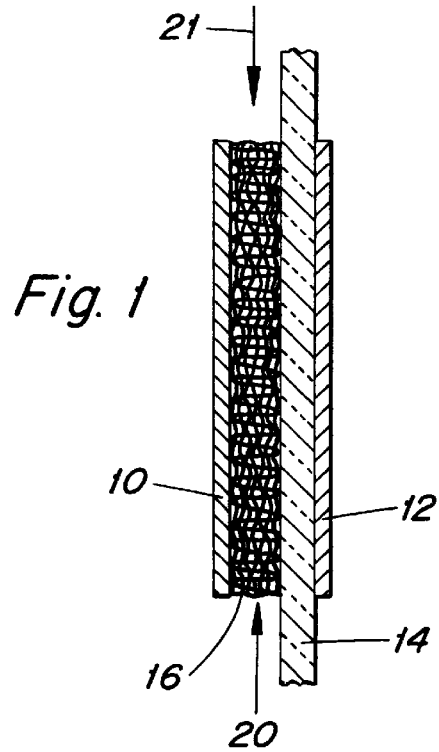
FIG. 1 is a section through a fundamental, optionally cylindrical or plate-shaped device in accordance with the invention with a gap.

FIG. 1, is a section through a fundamental, optionally cylindrical or plate-shaped device in accordance with the invention. A first electrode 10 lies at reference potential whereas a second electrode 12 lies at high-voltage potential. In the intermediate space between electrodes 10 and 12 is a dielectric 14 that is immediately in connection with the second electrode 12. The intermediate space between the first electrode 10 and the dielectric 14 constitutes a gap 16. Within this space is an electrically and thermally conductive gas-permeable arrangement 20. The gap 16 has oxygen-containing gas 21 flowing through it in the direction indicated by the arrow.

As long as the oxygen-containing gas 21 is exposed to the electric field, a gas discharge will effect a decomposition of the molecular oxygen into atomic oxygen, which will subsequently combine into tri-atomic oxygen molecules, which is ozone. The electrically and thermally conductive gas-permeable arrangement 20 dissipates the heat the occurs in the 16 due to the electric discharge and exothermic reaction of the oxygen atoms and effects by way of an expansion of the surface a diminution of the virtual gap and by way of the hollow-cathode effect an increase in the ozone yield.

Instead of the illustrated arrangement of the dielectric 14 immediately in contact with the second electrode 12, the dielectric 14 can also stand immediately in contact with the first electrode 10 and the gap 16 can be constituted between the dielectric 14 and the second electrode 12.

Figure 2:
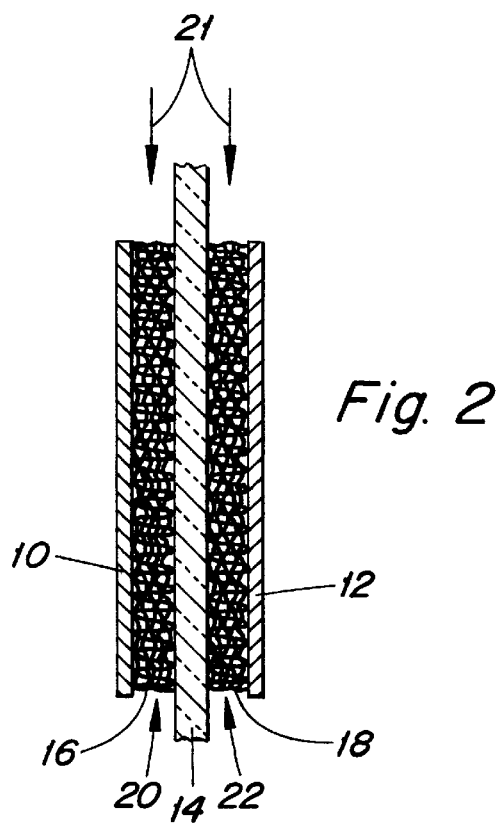
FIG. 2 is a section through a fundamental, optionally cylindrical or plate-shaped device in accordance with the invention with two gaps.

It is alternatively possible to provide two gaps instead of one gap. FIG. 2 illustrates a corresponding exemplary embodiment wherein the dielectric 14 is not immediately associated with one of the two electrodes 10 and 12 but is located so in the form of a discrete component between the electrodes 10 and 12 and in that gaps 16 and 18 are constituted on both sides of the dielectric 14. In this exemplary embodiment gaps 16 and 18 both exhibit electrically and thermally conductive gas-permeable arrangements 20 and 22. Both gaps 16 and 18 can be aligned both parallel and in series with respect to the gas flow.

Figure 3:
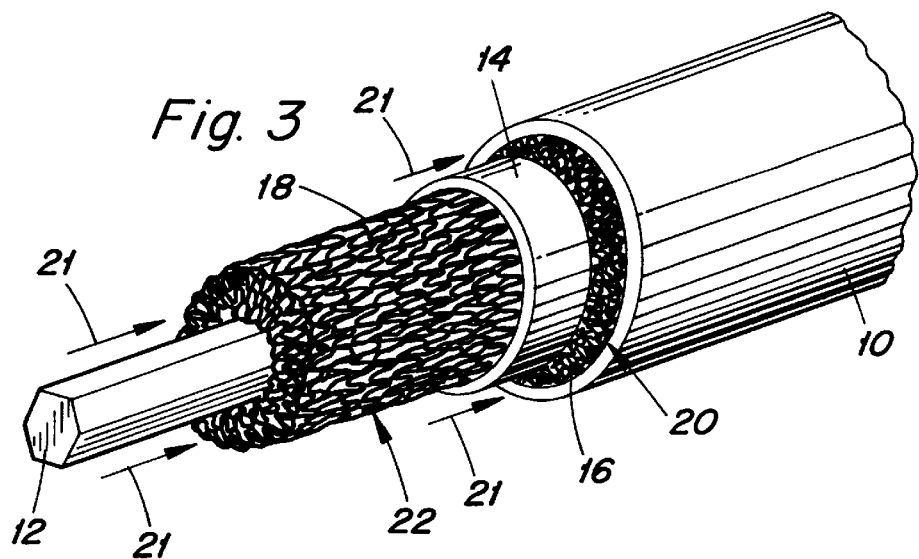
FIG. 3 is a perspective partly cutaway illustration of a device in a cylindrically symmetrical embodiment with a solid inner electrode.
Figure 4:
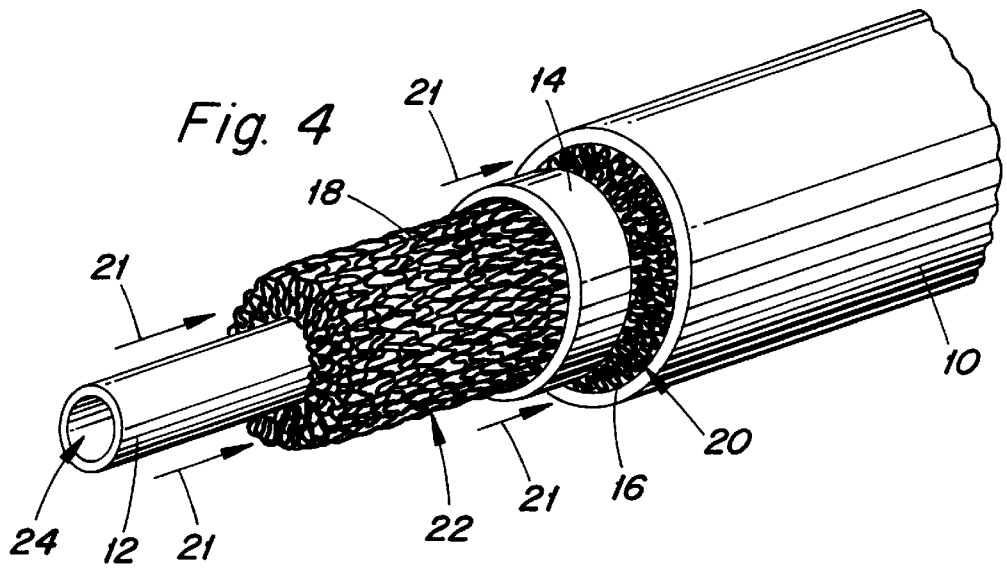
FIG. 4 is a perspective partly cutaway illustration of a device similar to that illustrated in FIG. 3, but with a hollow inner electrode.
Figure 5:
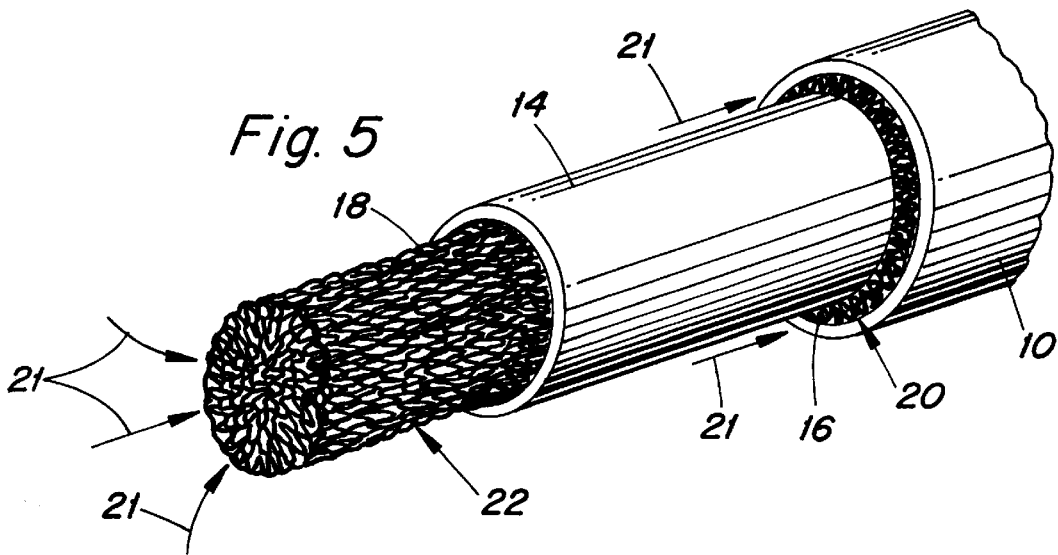
FIG. 5 is a perspective partly cutaway illustration similar to FIGS. 3 and 4, but with a gas-permeable arrangement that simultaneously constitutes the inner electrode.

FIGS. 3 through 5 illustrate a special cylindrically symmetrical embodiment of the device. A first outer electrode 10, which is at reference potential, accommodates in its interior a cylindrical dielectric 14 and it in turn a second inner cylindrical electrode 12, which is at high potential. Constituted between both the first electrode 10 and the dielectric 14 and between the dielectric 14 and the second electrode 12 are gaps 16 and 18. These gaps are filled up with an electrically and thermally conductive gas permeable arrangement 20 and 22.

In the embodiment in accordance with FIGS. 3 and 4 the electrically and thermally conductive gas-permeable arrangements 20 and 22 consist of a stocking-like wire knit drawn over the second electrode 12 as well as over the dielectric 14. The wire knit has a wire cross-section of less than 0.03 mm3 and fills up about 10% of the gap volume. High-grade steel is employed as a material. The first and second electrodes 10 and 12 as well consist of high-grade steel. Glass is employed as a material for the dielectric 14.

In the embodiment in accordance with FIG. 3 the second electrode 12 is solid and possesses a polygonal surface. This surface increases not only the field homogeneity and the formation of charge-active hollow spaces, but also facilitates the drawing of the stocking over the second electrode 12 and installation in the dielectric 14 in that, on the one hand, the friction is diminished and, on the other, the knit can yield in the event of radial mechanical forces against the flat regions.

The heat that occurs in the first gap 16 due to exothermic reaction is dissipated to the first electrode 10 by way of the stocking-like wire knit 20. The first electrode 10 is situated in a coolant, ice water for example, which represents a heat sink. The heat that occurs in the second gap 18 due to exothermic reaction is dissipated to the second electrode 12 by way the stocking-like wire knit 22. In the solid embodiment of the second electrode 12 illustrated in FIG. 3 the dissipation of the heat is carried out by heat conduction to a heat sink by way the electrode. In the embodiment in accordance with FIG. 4 the second electrode 12 is hollow and has a coolant 24, a gas for instance, flowing through it. In this event the heat is transferred to the coolant 24 and removed.

In the embodiment illustrated in FIG. 5 the entire space inside the dielectric 14 is filled with a woven, knit, or plait made of wire 22. No rigid electrode is present. The function of the second electrode, rather, is entirely assumed by the woven, knit, or plait.

Especially in the case of the device in accordance with the invention with an electrically and thermally conductive gas permeable arrangement 20, 22 of woven, knit, or plaited wire, there exists a more or less regular structure, which exhibits an inherent cohesion and comprises a multiplicity of hollow spaces. The gas to be ozonized can accordingly flow essentially freely through the arrangement without being noticeably impeded by the wires.

We claim:

1. A method of generating ozone from oxygen-containing gases by silent electric discharge in an arrangement with at least one gap defined by an electrode and a dielectric that separates the gap from another electrode, an electrically and thermally conductive gas-permeable arrangement being disposed in the gap and being in electrical and thermal contact with the electrode, the gas-permeable arrangement forming a spacer and having a regular structure completely filling the gap and contacting the dielectric and an internal cohesion and that comprises a plurality of hollow spaces, the method comprising the steps of:

applying a same electrical potential to all of the hollow spaces;

maintaining a silent electrical discharge in the hollow spaces according to a hollow-cathode effect;

causing oxygen-containing gas to flow through the gap and allowing the oxygen-containing gas to flow from one hollow space to another; and exposing the oxygen-containing gas to the silent electrical discharge to convert the oxygen-containing gas into ozone.

2. A device for generating ozone from oxygen-containing gases by silent electric discharge, comprising:

a first electrode;

a dielectric, the first electrode and the dielectric defining a gap;

a second electrode, the dielectric separating the gap from the second electrode;

at least one electrically and thermally conductive gas-permeable arrangement disposed in the gap and in electrical and thermal contact with the first electrode, the gas-permeable arrangement forming a spacer and having a regular structure completely filling the gap and contacting the dielectric and an internal cohesion and including a multiplicity of hollow spaces that are interconnected and permit gas to flow from one hollow space to another; and means for applying a same potential to all of the hollow spaces to maintain a silent electrical discharge according to a hollow-cathode effect in the hollow spaces.

3. A device according to claim 2, wherein the first electrode and the second electrode separated by the dielectric define two gaps, each of the two gaps being filled by the gas-permeable arrangement.

4. A device according to claim 3, wherein the first and second electrodes and the dielectric are plate-shaped.

5. A device according to claim 3, wherein the first and second electrodes and the dielectric are constructed cylindrically symmetrically, the dielectric being disposed in a space enclosed by the first electrode and the second electrode being disposed in a space enclosed by the dielectric and the electrically and thermally conductive gas-permeable arrangement centers the dielectric and the second electrode relative to the first electrode.

6. A device according to claim 2, wherein the first and second electrodes and the dielectric are plate-shaped.

7. A device according to claim 2, wherein the first and second electrodes and the dielectric are constructed cylindrically symmetrically, the dielectric being disposed in a space enclosed by the first electrode and the second electrode being disposed in a space enclosed by the dielectric and the electrically and thermally conductive gas-permeable arrangement centers the dielectric and the second electrode relative to the first electrode.

8. A device according to claim 7, wherein the second electrode includes a polygonal surface.

9. A device according to claim 8, wherein the second electrode is hollow.

10. A device according to claim 8, further comprising coolant, the first electrode being disposed in the coolant.

11. A device according to claim 7, wherein the second electrode is hollow.

12. A device according to claim 11, further comprising coolant, the coolant flowing in a hollow region of the second electrode.

13. A device according to claim 11, further comprising coolant, the first electrode being disposed in the coolant.

14. A device according to claim 7, further comprising coolant, the first electrode being disposed in the coolant.

15. A device according to claim 7, wherein an inside of the dielectric is completely filled with the gas-permeable arrangement and the gas-permeable arrangement simultaneously constitutes the second electrode.

16. A device according to claim 2, wherein the gas-permeable arrangement is a knit, and at least one of the second electrode and the dielectric is coated by the knit.

17. A device according to claim 2, wherein the gas-permeable arrangement in the form of one of a tangle, plait, woven, non-woven, and a knit of wire.

18. A device according to claim 17, wherein the gas-permeable arrangement is formed of oxygen- and ozone-resistant material.

19. A device according to claim 2, wherein the gas-permeable arrangement fills about 1 to 50% of the gap volume.

20. A device according to claim 2, wherein the gas-permeable arrangement is made of wire having a cross-sectional area smaller than $0.2$ mm$^2$.

21. A device according to claim 2, wherein the gas-permeable arrangement is formed of oxygen- and ozone-resistant material.

* * * * *